(No Model.)
J. P. CURRIE.
MACHINE FOR SAWING WOOD.
No. 469,734. Patented Mar. 1, 1892.
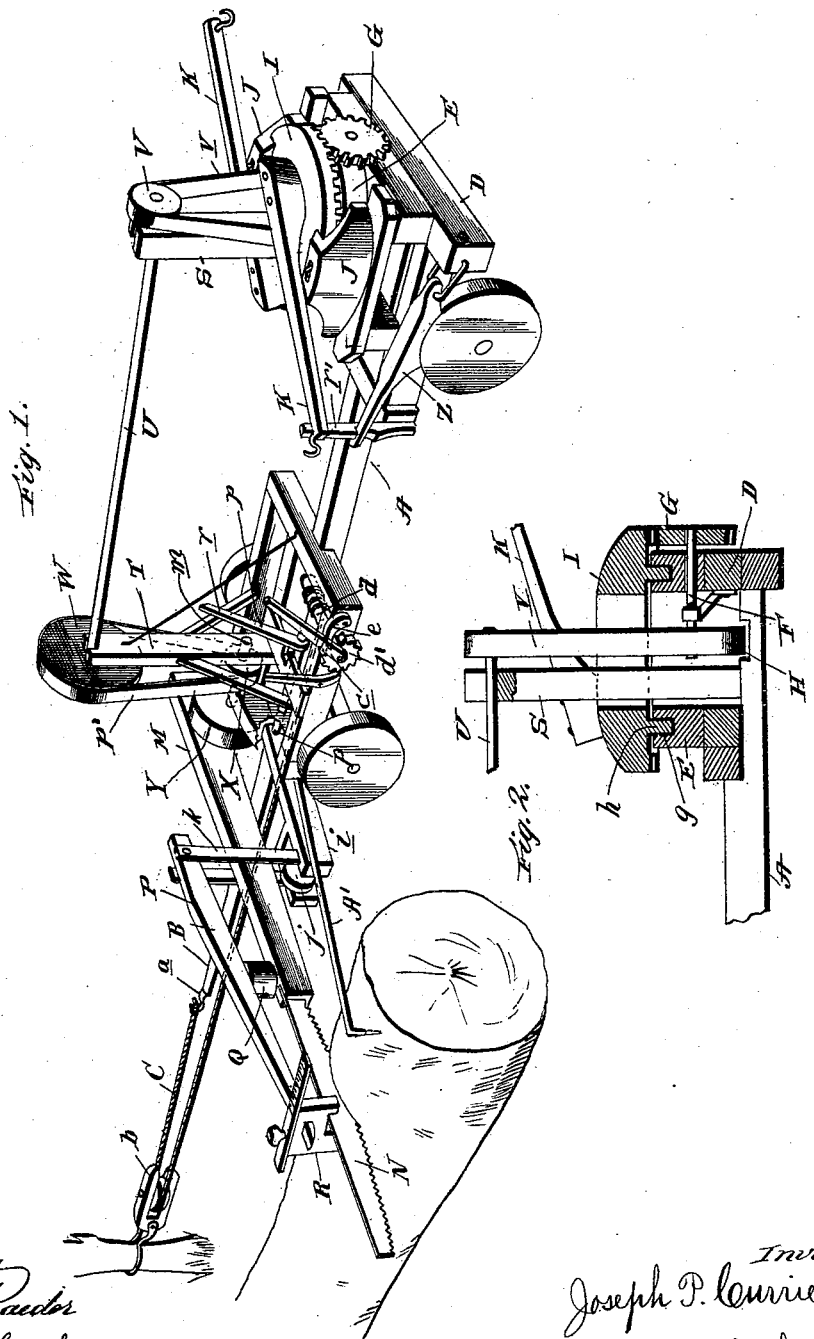
Witnesses:
C. H. Raeder
M. F. Matthews
Inventor
Joseph P. Currie
by James J. Sheehy
Attorney

UNITED STATES PATENT OFFICE.

JOSEPH P. CURRIE, OF MARCUS, WASHINGTON.

MACHINE FOR SAWING WOOD.

SPECIFICATION forming part of Letters Patent No. 469,734, dated March 1, 1892.

Application filed August 17, 1891. Serial No. 402,909. (No model.)

*To all whom it may concern:*

Be it known that I, JOSEPH P. CURRIE, a citizen of the United States, residing at Marcus, in the county of Stevens and State of Washington, have invented certain new and useful Improvements in Machines for Sawing Wood; and I do declare the following to be a full, clear, and exact description of the invention, such as will enable others skilled in the art to which it appertains to make and use the same.

My invention has relation to improvements in wood-sawing machines; and it consists in the construction, certain novel combinations, and the adaptation of parts hereinafter described, and particularly pointed out in the appended claims.

In the accompanying drawings, Figure 1 is a perspective view of my improved machine in an operative position, and Fig. 2 is a detail sectional view of a portion of the main power-gearing.

Referring by letter to the said drawings, A indicates the main portion or running-gear of my improved machine, which is mounted upon traveling wheels, as illustrated, whereby it may be readily moved from place to place. Suitably connected to and extending forwardly from the forward portion of the main frame or running-gear is a tongue or draft-pole B, whereby a team may be hitched to the machine when it is desirable to move the same a distance. This tongue or pole B is provided at its forward end with a hook $a$ or the like for the connection of a rope or cable C, which takes through a pulley-block $b$, fastened to a stake or other stationary object, and thence back to the machine, where it is made fast to a transverse windlass $d$, which is suitably journaled in the forward portion of the main frame, and is provided at its end with a reciprocating lever $c$ and a ratchet-wheel $d'$, which is normally engaged by a pawl $e$, pivotally connected to the side of the frame. By this construction it will be readily perceived that when the machine is employed to saw the trunk of a tree into short blocks it may be conveniently moved short distances without the help of a team of horses.

Suitably mounted upon the main frame over the rear axle is a rectangular frame D, upon the transverse beams of which a circular base-block E is suitably mounted, as better illustrated in Fig. 2 of the drawings. Taking diametrically through the wall of the circular block E and bearing therein is a longitudinally-disposed rotatable shaft F, which carries a vertical pinion G upon its rear end and a vertical pulley H upon its forward end, which rests within the block E, as illustrated in Fig. 2.

As better illustrated in Fig. 2 of the drawings, the block E is provided in its upper side with a circular oil-groove $g$, which is preferably of a rectangular form in cross-section, and is designed to receive and afford a bearing for the annular flange $h$ upon the under side of the annular gear-wheel I, which is provided on its under side adjacent its edge with teeth, which engage the pinion G, whereby the shaft F is rotated and the gearing connected therewith set in motion.

Suitably connected to the longitudinal beams of the frame D are keeper-blocks J, which are provided at their upper edge with inwardly-directed flanges, which engage the upper side of the annular gear I and prevent the same from casual play or displacement. Connected by bolts or the like to the upper side of the annular gear I, and preferably at opposite points with respect to each other, are two horizontal sweep-bars K, which are provided at their outer ends with hooks or the like for the attachment of a draft-animal.

Although I have illustrated my improved machine as provided with two sweeps, yet I do not desire to be confined to any specific number of sweeps, as one or more may be employed, according to the size of the machine.

M indicates the saw-beam, which is reciprocated transversely with respect to the machine, as will be presently described. Connected in a suitable manner to the forward end of the beam M is the saw-blade N, which may be of any suitable size and have teeth of any preferred form.

Bearing in the forward portion of the main frame is a longitudinal rock-bar $p$, which is provided at its rear end with a lever $r$, and is fixedly connected at its forward end to an auxiliary frame $i$, in which is journaled the shaft of a friction-roller $j$, upon which the saw-beam travels when in operation, whereby the saw may be readily raised and lowered when desirable. Rising from the parallel branches of the auxiliary frame $i$ are vertical standards $k$, between which is pivotally connected one end of a weight-lever P, which is provided at a suitable point in its length on its under side with a weight Q, which bears upon the upper side of the saw-beam and causes the saw to positively engage the log or other timber to be sawed. Attached to the forward end of the weight-lever P is a guide-block R, which is slotted in its lower edge to receive the upper edge of the saw-blade and prevent lateral play thereof.

Rising from the rear portion of the main frame and taking up through the annular gear-wheel I is a standard S, and rising from the forward portion of said frame is a standard T, both of which standards are preferably slotted at their upper ends to afford a bearing for a longitudinal rotatable shaft U, which carries a vertical pulley V at its rear end, and a vertical pulley W at its forward end, as illustrated. Bearing in the lower portion of the forward standard T and in a block upon the forward portion of the main frame is a longitudinally-disposed rotatable shaft $m$, which carries a small pulley X, adjacent its rear end, and a fly-wheel Y at its forward end, to which fly-wheel the saw-beam M is eccentrically connected, whereby when the wheel is rotated the said beam will be caused to rapidly reciprocate.

Connecting the pulley H of the shaft F and the pulley V of the shaft U is an endless belt $v$, and connecting the pulley W of the shaft U and the pulley X of the shaft $m$ is a belt $p'$, through the medium of which motion is transmitted from the main power-gearing to the longitudinal shaft U and from said shaft to the reciprocating saw-beam.

Rising from the rear portion of the main frame, at one side thereof and in advance of the rear wheels, is a post $r'$, which is notched on one side, as illustrated, to receive and lock one end of a brake-bar Z. This brake-bar Z, which is loosely connected at its rear end to the rear transverse beam of the main frame, is provided in its under side with a curvilinear recess, as illustrated, to conform to the periphery of one of the rear wheels upon which said bar bears and which it brakes when seated in the notch of the post $r'$.

Suitably connected to the main frame at one side and adjacent the forward end thereof is a bar A', which is provided at its free end with a pointed branch which is designed to be driven into a log to hold the machine thereto during operation.

In operation the animals attached to the sweeps K travel in a circle, whereby the annular gear-wheel I is caused to rotate. The motion of the gear-wheel I is transmitted to the longitudinal shaft U through the medium of the pinion G, shaft F, pulley H, belt $v$, and pulley V, and motion is transmitted from the said shaft U to the saw-beam through the medium of the pulley W, belt $p'$, pulley X, shaft $m$, and fly-wheel Y. By this gearing it will be readily seen that although the draft-animals may walk slow the saw will be very rapidly reciprocated and driven through the log or other timber to be sawed.

In the foregoing specification I have specifically described the construction and relative arrangement of the several parts of my machine; but I do not desire to be confined to such specific construction, as such changes may be made as fairly fall within the scope of my invention.

Having described my invention, what I claim, and desire to secure by Letters Patent, is—

1. In a sawing-machine, the combination, with the main frame, the movable auxiliary frame extending laterally from said main frame, and a friction-roller journaled in the auxiliary frame, of a reciprocating saw adapted to bear upon the friction-roller, the lever pivotally connected at one end to standards rising from the auxiliary frame, the weight connected to the lever and bearing upon the saw, and a block connected to the free end of the lever and having a notch in its lower edge adapted to receive and guide the same, substantially as and for the purpose specified.

2. In a sawing-machine, the combination, with the main frame supported on traveling wheels and the post $r'$, rising from the frame at one side in advance of the rear wheels, of the bar A', having a pointed branch at its free end and the brake-bar loosely connected at its rear end to the main frame and having a curvilinear recess in its under side and adapted to be held by a notch in the post $r'$, substantially as and for the purpose specified.

3. In a sawing-machine, the combination, with the pulley-block adapted to be connected to a stationary object, of a windlass journaled in the main frame and carrying a ratchet-wheel and a lever at one end, a pawl connected to the main frame and normally engaging the ratchet-wheel, the pole extending forwardly from the forward portion of the main frame, the rope or cable connected at one end to said pole and taking through the pulley and connected to the windlass of the main frame, the movable auxiliary frame, the friction-roller journaled in the auxiliary frame, the reciprocating saw adapted to bear upon the friction-roller, the lever pivotally connected to standards rising from the auxiliary frame, the weight connected to the lever and bearing upon the saw, and the block connected to the free end of the lever and having a notch in its lower edge to receive and guide the saw, substantially as specified.

4. In a sawing-machine, the combination, with the main frame and auxiliary frame, of the friction-roller journaled in the auxiliary frame, the reciprocating saw adapted to bear upon the friction-roller, the lever pivotally connected at one end to standards rising from the auxilary frame, the weight connected to the lever and bearing upon the saw, the notched block secured to the lever and adapted to receive and guide the saw, the annular gear-wheel I, having teeth on its under side, a sweep connected thereto, the rear longitudinal shaft F, the pinion G on said shaft meshing with the teeth of the annular gear, the pulley also mounted on said shaft, the main longitudinal shaft carrying pulleys at its opposite ends, the belt connecting the rear pulley of the main shaft with the pulley on the rear shaft F, the forward longitudinal shaft carrying a pulley, a fly-wheel mounted on said shaft and connected eccentrically to the saw-wheel, and the belt connecting the pulley of the forward longitudinal shaft and the forward pulley of the main shaft, all adapted to operate substantially as specified.

In testimony whereof I affix my signature in presence of two witnesses.

JOSEPH P. CURRIE.

Witnesses:
E. D. MINER,
S. F. SHERWOOD.